May 23, 1967  E. R. HARMON  3,320,691
ROTATING SIGN CONSTRUCTION
Filed Jan. 7, 1965  2 Sheets-Sheet 1

INVENTOR.
EDWIN R. HARMON
BY Robert R. Finch
ATTORNEY

*INVENTOR.*
EDWIN R. HARMON
BY *Robert A. Finch*
ATTORNEY

United States Patent Office 3,320,691
Patented May 23, 1967

3,320,691
ROTATING SIGN CONSTRUCTION
Edwin R. Harmon, 2193 Bendamere Circle,
Salt Lake City, Utah 84109
Filed Jan. 7, 1965, Ser. No. 423,921
3 Claims. (Cl. 40—33)

This invention relates generally to display signs and more particularly to rotating signs and mechanisms or so-called "turning units" for effecting rotation thereof.

Currently available rotating signs employ a turning unit generally comprising a driven transmission having an output or torque transmitting shaft. In such constructions the sign is mounted either on the shaft itself for rotation therewith relative to the transmission or is secured to the transmission to rotate therewith relative to the shaft.

The first mentioned arrangement in which the sign is mounted on and rotates with the output shaft is advantageous in that the turning unit is mounted exteriorly of the sign thereby simplifying mounting of the sign and enabling ready access for maintenance. Although this type construction has found relatively wide use, it still possesses inherent faults that makes its use with large signs impractical. Moreover, such prior design necessarily imposes undesirable thrust and radial forces on the transmission bearings as well as bending moments and shear forces on the output shaft all of which result in high maintenance costs.

As noted, the usual prior construction results in the imposition of bending moments and shear forces on the output shaft as well as thrust and radial forces on the bearings by which the shaft is journalled in the gear box or transmission. Bending moments, shear forces and radial loads are the result of wind acting against the sign while thrust forces are imposed by the weight of the sign.

To a limited degree, these forces can be accommodated by beefing up the construction of the transmission and output shaft, but the cost of the resulting structures are prohibitive and their size impractical for use with usual signs.

It is the primary object of the present invention to provide a rotating sign construction in which the transmission of the turning unit may be mounted exteriorly of the sign while the output shaft and the transmission and bearings are completely isolated from the bending and shear forces as well as thrust and radial load imposed on the sign and supporting structure by winds or other outside influences.

A further and important object is the provision of a rotating sign construction in which thrust loads are borne by structural elements other than the transmission and output shaft.

A related object is to provide a turning unit useful for rotating signs or other objects in which the transmission and output shaft are subjected only to torque load thereby enabling the employment of precision lightweight construction that is low in initial cost and yet has maximum longevity at minimum upkeep and is readily accessible for normal installation, adjustment and service.

Still another object is the provision of a structure attaining the foregoing objects and adaptable to a wide range of sizes of signs.

In order that the invention may be readily understood and carried into effect, reference is made to the accompanying drawings which are offered by way of illustration and not in limitation of the invention, the scope of which is defined by the appended claims rather than by any detailed description.

Figure 1:
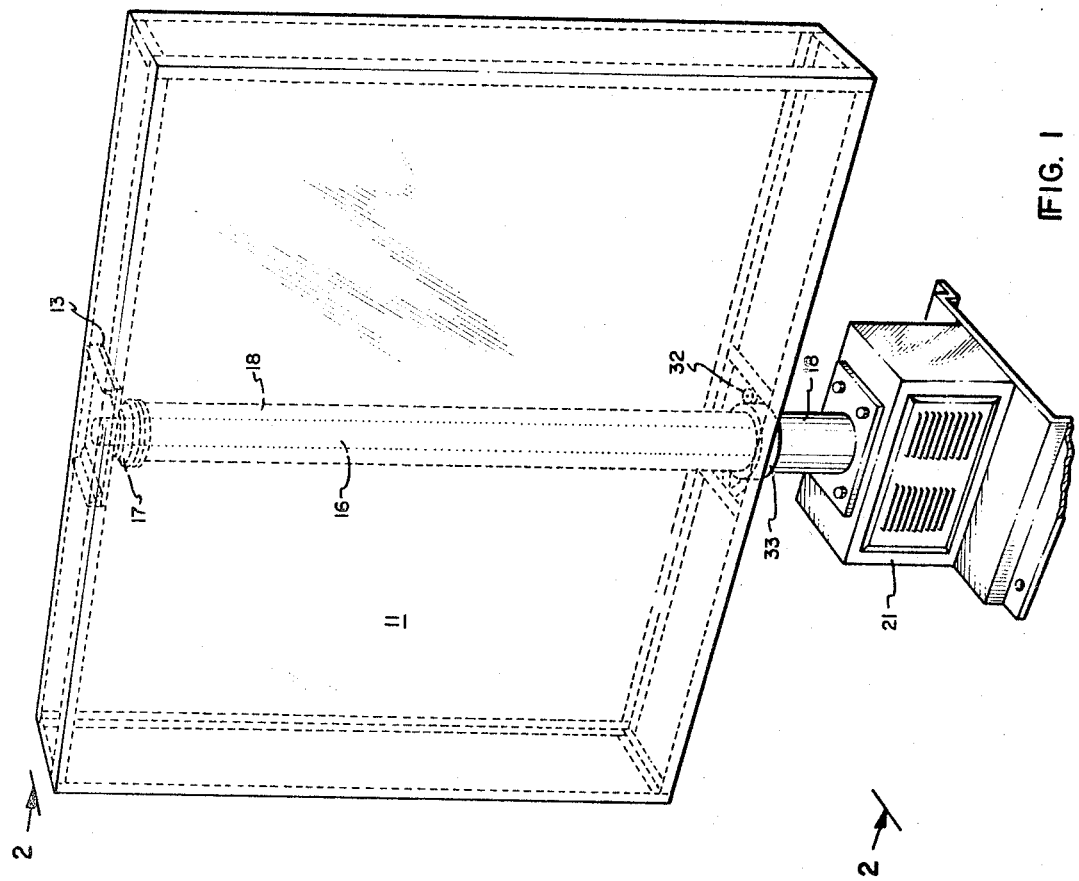
FIG. 1 is a perspective view of a rotating sign embodying the invention, certain hidden elements being shown in dotted lines for purposes of clarity.

As illustrated, the rotating sign assembly comprises a usual box-like display sign 11 which may be suitably illuminated by means of wires 12 threaded through the hollow structure in known fashion.

In the embodiment illustrated, the top of the sign rests on and is secured to a rotatable support member 13 which is in turn suitably fixed, as by a roll pin or set screw 14, to a hollow torque tube or shaft 16. The shaft 16 is journalled for rotation in a thrust bearing 17 that is fixed to the top of a support column 18. A collar 19 surrounds the shaft 16 and is secured thereto by a set screw 20 to thus rest on the bearing 17. As will be more fully described, the lower end of the torque shaft 16 is flexibly coupled to the transmission output shaft 24 in a manner such that the combined weight of the sign 11, the rotatable support member 13 and the shaft is borne by the bearing 17 and in turn by the support column 18 and the base housing 21 in which the motor and transmission are enclosed. Thus, the torque shaft 16 and the output shaft 24 with associated bearings are completely isolated from thrust or compressive forces.

As shown, the support column 18 is suitably fixed, as by welding or bolts, to a base housing 21 on which it rests to form an integral structure. A drive mechanism, including a motor 22 and a gear box or transmission 23 is secured to and enclosed in the base housing; and the base may rest on the ground or any other ultimate support.

The transmission output shaft 24 extends from the transmission outwardly toward the interior of the support column substantially axially thereof and in alignment with the torque tube or shaft 16 which extends downwardly from the thrust bearing. Obviously, the output shaft 24 can be shortened or lengthened; and it would be possible to eliminate the shaft 24 so long as means are provided for flexibly connecting the torque tube 16 to the transmission output gear.

Figure 3:
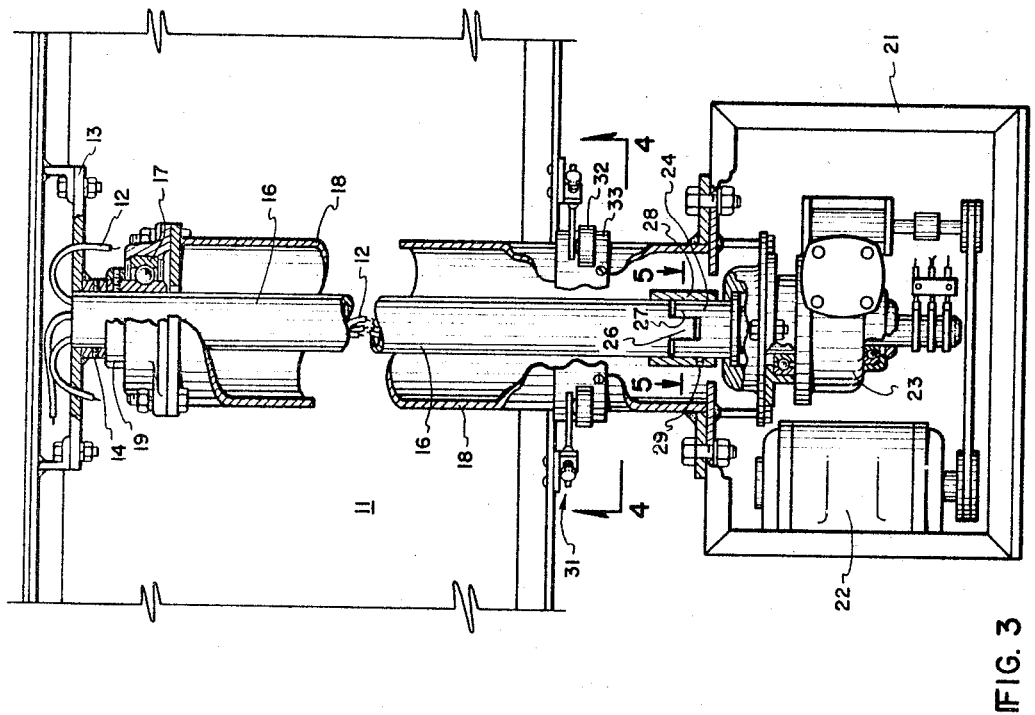
FIG. 3 is a vertical sectional view of the turning unit of the invention, certain parts being shown in elevation in order to simplify the description.
Figure 5:
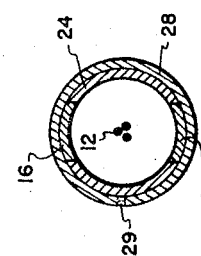
FIG. 5 is a sectional view taken in the plane of line 5—5 of FIG. 3 and looking in the direction of the arrows 5 of FIG. 3.

As best shown in FIGS. 3 and 5, the torque tube 16 is keyed to the output shaft by means of tangs 26 on the wall of the torque tube which engage complemental recesses or notches 27 on the wall of the output shaft; and the walls are held in alignment to maintain such engagement by a collar 28 suitably held in place on only the output shaft as by a set screw 29. In general terms then, the shafts are connected together by means providing for only torque transmission; and the connection is axially flexible in the sense that thrust or compressive forces are not transmitted from one shaft to the other.

In this connection, it will be noted that the junction between the torque tube 16 and output shaft 24 is such that a small clearance exists between the two. This is important as it completely isolates the transmission from the thrust imposed by the weight of the sign. In this connection, other types of known flexible couplings may be employed to achieve the same results.

Although the drive unit is shown with the sign above the support column and base, it is obvious that a reverse arrangement may be employed in which the sign hangs from the unit. In such a case the thrust bearing and torque shaft assembly will be assembled to accommodate the reverse thrust; and the connection between the torque tube and output shaft will still function without any thrust on the transmission. In order to facilitate assembly and accommodate minor structural and operational deviations, the thrust bearing 17 at the upper end of the support column is desirably of the self-aligning type.

As previously described, the support column 18 and the base housing 21 are secured together as a rigid unitary structure and the sign hangs or rests thereon closely adjacent the top. This is critical to the invention because it is by this construction that the wind imposed forces are absorbed only by the column and base and the transmission is isolated therefrom.

Isolation of the transmission and output shaft from bending and shear forces also eliminates radial loads on the transmission bearings. In any transmission, the output shaft must be journalled in one or more bearings and if the shaft is tilted or subject to shear forces the loads thereby imposed on the bearings inevitably reduce their life. However, in the present invention no radial loads are imposed on the transmission bearings due to wind because neither bending nor shear forces are transmitted thereto.

Figure 2:
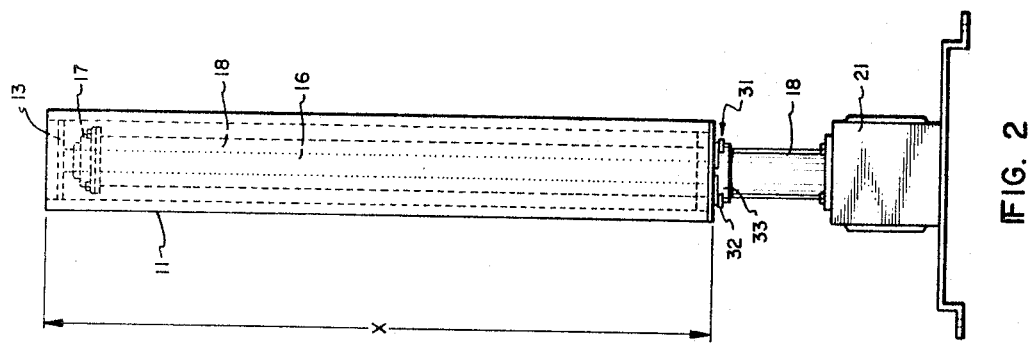
FIG. 2 is a side elevational view taken as looking in the direction of arrows 2 of FIG. 1 certain hidden elements being shown in dotted lines for purposes of clarity.
Figure 4:
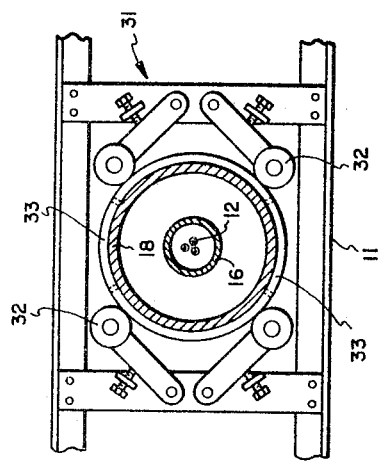
FIG. 4 is a partial bottom view of the sign taken in the plane of line 4—4 of FIG. 3 looking in the direction of the arrows 4 of FIG. 3.

Location of the connection between the sign and the rotatable support 13 is also important in reducing strain on the structure by minimizing overall wind effect. Thus, the sign should be connected to the rotating member at a location at or further away from the base housing than the center of the sign. In other words, if the vertical dimension of the sign is X (FIG. 2) then the connection should be located at a distance of at least ½X above the bottom of the sign. When the connection is at the center of the sign (i.e. midway between top and bottom) the bending or rotational moments about the support member 13 are neutralized and strain on the torque tube 16 and bearing 17 is limited to those due to shear. When the connection is further away, for instance, at the top of the sign, as in the illustrated embodiment, the result is the same insofar as the strain on the shaft 16 and bearing 17 is concerned because the sign is restrained from movement by the bottom guide assembly 31 (FIGS. 3 and 4) mounted on the sign. This assembly is provided with wheels or other guides 32 which bear against the outer wall of the support column 18 as more fully described below. On the other hand, if the sign connects to the support member a distance less than ½X above the bottom of the sign, then bending or rotation about the support member 13 is encouraged and extra strain is imposed on the bottom guides.

In connection with the bottom guide assembly and its relation to the support column, it will be noted that the illustrated embodiment employs a cylindrical support column thus providing by itself an ideal track for the guide wheels to follow. However, it is not necessary that the column be cylindrical. Indeed, it may be hexagonal in form or even be an open cage structure so long as a smooth continuous surface is provided for engagement by the guide wheels 32.

Although the guide assembly is necessary, it is a source of wear on the support column especially if the wind forces are high or the wheels stick or break. The present invention overcomes this problem by providing a replaceable wear surface in the form of a circular collar 33 detachably secured to the column. Such a collar may be employed with any type support column.

Obviously, the motor and transmission may be of any suitable type providing the necessary torque and speed for the output shaft 24, it being only necessary to the invention that there be an output rotatable with respect to the housing and connectable to the torque tube for effecting its rotation; and the wiring may be passed through the shaft 24 and torque tube 16 as necessary to service the sign. Moreover, the structure is versatile in that larger or smaller signs are accommodated simply by changing the length and/or diameter of the support column 18 and the torque tube 16.

Although the invention has been shown, described and claimed with reference to a construction in which the sign is located above the base housing, it is intended that such description is for clarity only and will embrace also structures in which the sign is suspended below the housing.

From the foregoing it is apparent that the present invention provides a unique and highly useful rotating sign construction in which the transmission furnishes only torque while it and its bearings are isolated from the deleterious effects of bending and shear forces as well as thrust; and the invention additionally provides a turning unit adapted to use in rotating signs and other objects of a wide variety of sizes.

I claim:

1. A rotating sign comprising a base housing including an elongated hollow support column, a shaft journalled for rotation inside said column and extending axially from inside said column to terminate outside said column, a sign fixedly connected to said shaft for rotation therewith said connection being intermediate the top and bottom of said sign, guide means adjacent the bottom of said sign and encircling said column, and a collar detachably mounted on said column providing a surface for engagement by said guide means.

2. A rotatable display sign comprising in combination a base, an elongated hollow support column secured at one end to said base and extending therefrom a fixed distance to terminate at a free end, an output shaft aligned axially with the interior of said support column and mounted for rotation with respect to said base and column, a bearing adjacent the free end of said column, a torque transmitting shaft journalled for rotation in said bearing and extending axially inside said column toward said output shaft, means connecting one end of said torque transmitting shaft to said output shaft, a sign to be rotated fixed to the other end of said torque transmitting shaft adjacent said bearing at a location above the bottom of said sign, guide means on said sign adjacent its bottom, and a collar encircling said column to be engaged by said guide means.

3. A rotatable display sign comprising in combination a base, a rigid column secured at one end to said base and extending upwardly therefrom, an output shaft in said base mounted for rotation with respect thereto and directed axially of the interior of said column, a torque transmitting shaft extending axially inside said column toward said output shaft, a bearing adjacent the other end of said column journalling said torque transmitting shaft for rotation and absorbing axial thrust, a sign of vertical dimension X connected to the free end of said torque transmitting shaft adjacent said bearing, said connection between the sign and said shaft being at a distance above the bottom of said sign at least equal to ½X, and axially flexible means connecting the other end of said torque transmitting shaft to said output shaft for the transmission of torque between said shafts.

References Cited by the Examiner

UNITED STATES PATENTS

| | | | |
|---|---|---|---|
| 308,761 | 12/1844 | Fawkes | 40—33 |
| 2,741,861 | 4/1956 | Roe | 40—33 |
| 2,939,330 | 5/1959 | Margetts | 40—33 X |

EUGENE R. CAPOZIO, *Primary Examiner.*

P. WILLIAMS, *Assistant Examiner.*